Dec. 23, 1958    E. F. DEFFENBAUGH ET AL    2,865,272
SELF COCKING SHUTTER WITH DOUBLE EXPOSURE PREVENTION DEVICE
Filed May 24, 1956      2 Sheets-Sheet 1
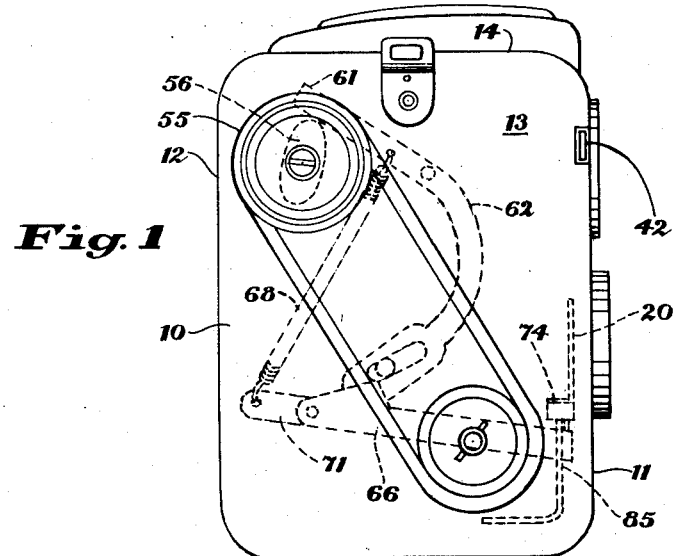
Edmund F. Deffenbaugh
Harold L. Malone
INVENTORS
BY
ATTORNEYS Dec. 23, 1958   E. F. DEFFENBAUGH ET AL   2,865,272
SELF COCKING SHUTTER WITH DOUBLE EXPOSURE PREVENTION DEVICE
Filed May 24, 1956                                2 Sheets-Sheet 2
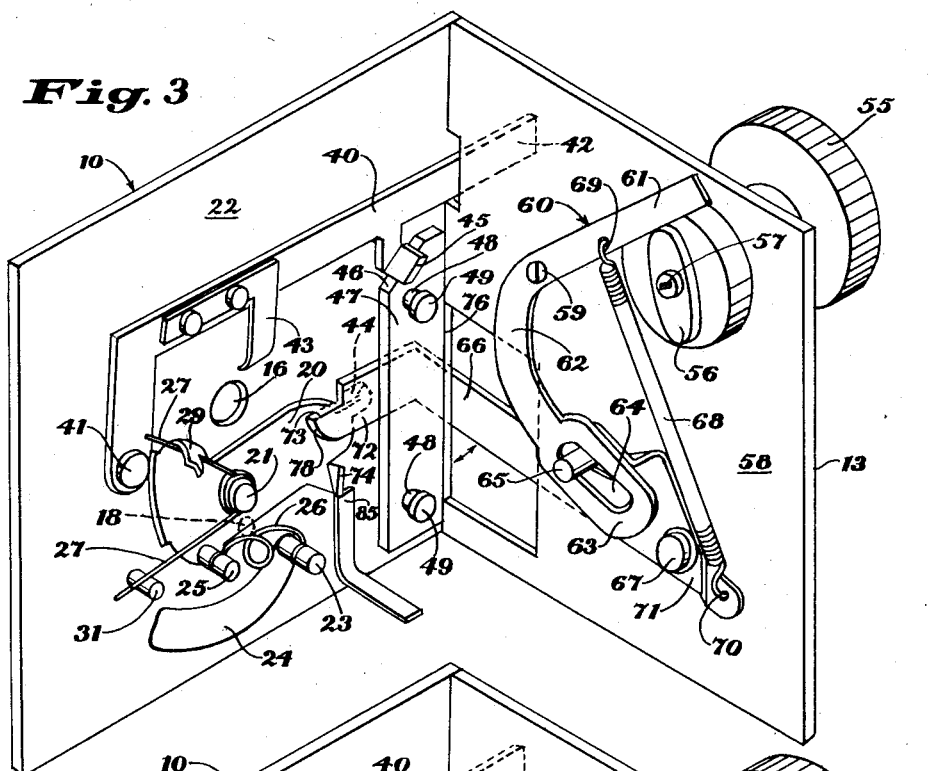
EdmundF. Deffenbaugh
Harold L. Malone
INVENTORS
BY
ATTORNEYS United States Patent Office 2,865,272
Patented Dec. 23, 1958

2,865,272

SELF COCKING SHUTTER WITH DOUBLE EXPOSURE PREVENTION DEVICE

Edmund F. Deffenbaugh and Harold L. Malone, Rochester, N. Y., assignors to Eastman Kodak Company, Rochester, N. Y., a corporation of New Jersey Application May 24, 1956, Serial No. 587,156

13 Claims. (Cl. 95—31)

The present invention relates to cameras of the roll film type, and more particularly to a self-cocking shutter and a double exposure prevention device therefor.

Cameras now on the market provide arrangements for preventing double exposure by locking the wind-up mechanism after a film area has been wound. Also, many cameras provide arrangements for setting, tensioning or cocking the shutter during at least a portion of the wind-up operation. However, the present invention provides a novel arrangement for cocking the shutter from the film winding mechanism. Also, in the present invention double exposure prevention is not secured by the locking of the wind-up means; but, on the contrary, by a novel arrangement by which the film winding is disconnected from the shutter setting so the shutter cannot be reset or cocked until the film is wound, thus preventing a double exposure.

The present invention has as its principal object, the provision of a novel connecting means between the film winding mechanism and the shutter cocking mechanism.

A further object of the invention is the provision of a connecting means which is completely and automatically disconnected from the shutter after the latter has been cocked, and which cannot again be connected thereto until the shutter has been tripped or actuated to make an exposure and the exposed film has been wound.

Yet another object of the invention is the provision of means controlled by the shutter to trip or actuate the member for moving a portion of the connecting means out of the path of the shutter parts when an exposure is being made.

And still another object of the invention is the provision of mechanisms of the class described, which are simple in design, rugged, easy to operate, effective and automatic in their operation.

To these and other ends, the invention resides in certain improvements and combinations of parts, all as will be hereinafter more fully described, the novel features being pointed out in the claims at the end of the specification.

In the drawings:

Fig. 1 is a side elevation view of a camera showing the relation thereto of the shutter setting or cocking mechanism, and the double exposure prevention device of the present invention;

Fig. 2 is a perspective view of part of the camera body showing the relation of the parts at the end of the shutter tensioning or cocking operation;

Fig. 3 is a view similar to Fig. 2, but showing the relation of the parts at the end of the shutter actuating operation;

Fig. 4 is a view similar to Figs. 2 and 3, but showing the relation of the parts at the start of the shutter setting operation, and Fig. 5 is a front view of the front plate of the camera, showing the relation of the aperture closing blade to the exposing aperture.

Similar reference numerals throughout the same views indicate the same parts.

The present invention is embodied in the present instance by way of illustration, in a self-cocking shutter and double exposure prevention device of the type shown in the drawings.

In the present embodiment, the invention is shown as used with the type of camera body illustrated in Fig. 1, but this is for illustrative purposes only and is not intended to limit the use of that device for that particular type of camera. On the contrary, however, the structures of the present invention are adapted for use with a wide variety of camera body designs.

The camera illustrated in Fig. 1 has a hollow body portion formed with a front wall 11, back wall 12, opposite walls 13, only one of which is shown, a top 14 and a bottom 15. The front wall 11 has formed therein an exposure aperture 16 of suitable size. The aperture closing blade 17 is pivoted at 18 on the front face 19 of the wall 10, as shown in Fig. 5 and is adapted to be moved to and from closing or covering relation with aperture 16, as is deemed apparent. A cover blade 20 is pivoted at 21 on the rear face 22 of wall 10, and is also adapted to be moved to and from closed or covering relation with aperture 16. The closing blade 17 and the cover blade 20 constitute a shutter which controls the exposure to the aperture 16, as is deemed apparent. In order that the blades 17 and 20 may control an exposure, these blades are connected together so that they operate in a definite manner and in proper timed relation. To this end, the blades are connected together in a manner to be described presently.

To secure this result, the blade 17 is provided, below its pivot 18, with a rearwardly extending pin 23 which extends rearwardly through an arcuate slot 24 in plate 10, as shown in Figs. 2-4. The cover blade 20 is also provided with a rearwardly extending pin 25 positioned below the pivot 21 thereof. The pins 23 and 25 are connected by a hairpin spring 26 which yieldably connects the blades 17 and 20, as is deemed apparent from an inspection of the drawings. It is also apparent that the spring 26 so connects the blades 17 and 20 that if one of the blades is rocked about its pivot, spring 26 will impart a rocking motion to the other blade also to move the latter about its pivot, the purpose of which will be later described. A coil spring 27 is wrapped around the pivot 21 of blade 20 and has the end secured to an ear 29 on blade 20, and the other end positioned against a post 31 projecting rearwardly from face 22 of plate 10.

An L-shaped shutter tripping or releasing member 40 is pivoted at 41 on the rear face 22 of wall 10, and has a finger operating portion 42 which projects beyond side wall 13, as shown in Figs. 2–4. A lug 43 depending from the tripping member 40 is adapted to engage and cooperate with an upwardly extending lug 44 on the blade 20 to hold the latter on the blade 17 in a set or cocked position as illustrated in Fig. 2. The member 40 is also provided with a second depending lug 45, which is adapted to be moved downwardly to engage an inclined upper edge 46 of a follower 47 slidably mounted on the rear face 22 of wall 10, as shown in Figs. 2-4. The follower is provided with a pair of vertically spaced inclined slots 48 through which extend pins 49 carried by and projecting rearward from the rear face 22 of wall 10. It is deemed apparent from an inspection of Figs. 2-4 that if the finger portion 42 is pressed downwardly, the member 40 will rock clockwise about its pivot 41. Such rocking will cause lug 43 to be moved out of cooperating and holding relation with the lug 44 of blade 20. In addition, lug 45 will move downward to engage edge 46 of follower 47 to move the latter downward. Due to the inclined slots 48, this downward movement is accompanied by a lateral rightward movement of follower 47, the purpose of which will be later described.

Wall 13 has mounted on the outside thereof a winding knob 55 the inner end of which carries a cam 56 formed with a lug or feather 57 adapted to engage in a slot, not shown, in the film spool, not shown. As the film spool may be of any standard or well known construction and forms no part of the present invention, details thereof are not shown or described. Suffice it to say that rotation of the knob 55 and cam 56 will, through lug 57, also rotate the film spool to wind up the exposed image areas thereon. The inner surface 58 of wall 13 has pivotally mounted thereon at 59 a bellcrank 60 one arm 61 of which rides on cam 56. The other arm 62 of the bellcrank is provided with an enlarged end portion 63 formed with a slot 64 in which is positioned a pin 65 carried by an arm 66 pivoted at 67 on 58. A coil spring 68 has one end 69 connected to arm 61 and the other end 70 connected to a portion 71 of lever 66 extending to the right of pivot 67.

It is deemed apparent from the above description that when knob 55 and cam 56 are rotated in a counterclockwise direction, Figs. 2–4, the cam 56 engages arm 61 and will impart a counterclockwise rotation to the bellcrank 60. This rotation of the bellcrank will, through the pin-and-slot connection 65—64 impart a vertical rocking to arm or lever 66 about its pivot 67. The arm or lever 66 is made of a thin flexible material so that the arm may be flexed or moved toward or away from wall 13, as shown by the double arrows, and for a purpose to be later described. The left or free end of lever 66, Figs. 2–4, is bent to form a portion 72 which is normal to arm 66 and parallel to wall 10, and is positioned between the latter and the follower 47, all as illustrated in Figs. 2–4. The free end of portion 72 is formed with a lug or operating member 73 which is positionable in the path of and adapted to engage the rearwardly extending lug 74 on cover blade 20 to rock the latter counterclockwise about its pivot 21 to tension blade 20 as well as blade 17.

With the above parts in mind, the operation of the structure of the present invention will now be described. Starting with the parts as shown in Fig. 2, in which the blades 17 and 20 are tensioned, the blade 20 covers the exposure aperture 16 while an arcuate slot 75 of the blade 17 uncovers the aperture 16. The parts are now ready to make an exposure. Also, the blade 20 is held in this position by reason of the engagement of lug 43 on member 40 with lug 44 of blade 20. The lug 73 will be positioned vertically somewhere between its upper position shown in Fig. 2 and its lower position shown in Fig. 4. The exact position of lug 73 will depend upon the amount of rotation of the knob 55 necessary to wind up the preceding exposed image area. However, in all cases the lug 73 will be positioned in the path of, but will be out of engagement with, lug 74. Now, when the finger portion 42 is depressed, the member 40 is rocked clockwise about its pivot 41. Such rocking will bring lug 45 into engagement with the surface 46 of follower 47 to move the latter downward. Due to the pin-and-slot arrangement 49 and 48, this downward movement of the follower 47 is accompanied by a lateral and rightward movement thereof. This rightward movement of the follower 47 serves to bring the right edge 76 thereof into engagement with the left or inner face of the lever 66 to move or flex the latter to the right or towards wall 13 to move lug 73 out of the path of lug 74. This movement occurs a split second before lug 43 of member 40 moves out of holding relation with lug 44 of blade 20. Disengagement of lugs 43 and 44 frees blades 17 and 20 and the latter now rock clockwise about their pivots under the action of the tensioned spring 27. Such clockwise movement of blade 20 will move pin 25 thereof to the left, and when the pin 25 passes dead center the spring 26 will act on pin 23 to rock blade 17 clockwise, as viewed in Fig. 5, to move the arcuate slot 75 out of registry with the aperture 16 so that the blade 17 will now cover the aperture, the blade 20 being moved to the position shown in Fig. 3 to uncover the aperture. Such movement of the blades uncovers the aperture 16 for a sufficient length of time to make the exposure, and the next operation is to wind up the exposed image area onto the take-up spool.

The second half of the cycle is accomplished by rotating the knob 55 and cam 56 to rotate the film take-up spool. As mentioned above, such rotation will rock bellcrank 60 counterclockwise and this rocking will impart a vertical rocking to lever 66. At the end of the winding operation the lever 66 may be positioned anywhere between its upper position shown in Fig. 2 or its lower position shown in Fig. 4. Assuming now that the lever 66 has been stopped in the position shown in Figs. 2 and 3, the rotation of the knob 55 will cause the portion 72 and lug 73 to move downward towards the position illustrated in Fig. 4. It will be noted, however, that the lug 74 is positioned below and in the path of the lug 73 of lever 66. However, as the latter is moved downward the under curved or cam surface 78 of lug 73 will finally engage lug 74. Such engagement will cause the lug 73, and hence arm 66 which is flexible, to be flexed or moved to the right or toward wall 13 to permit lug 73 to slide over lug 74. After the lug 73 has passed below the lug 74, the flexible lever 66 flexes to the left or away from wall 13 to position lug 73 below and in the path of lug 74. The parts are now in the position illustrated in Fig. 4.

Rotation of the knob 55 and cam 56 is continued until the point is reached where the cam 56 will now impart a counterclockwise rocking movement to the bellcrank 60 and this movement will impart a clockwise movement to lever 66 about its pivot 67 to move the portion 72 and lug 73 upward to engage lug 74 with blade 20. Continuous rotation of knob 55 will cause lug 73 to impart a counterclockwise movement to the blade 20 and this movement will tension spring 27. This counterclockwise rocking of the blade 20 is continued until the lug 43 and member 40 finally slide under and is held engaged by lug 44 of blade 20 to hold the blade in aperture covering position shown in Fig. 2. During this counterclockwise rocking the pin 25 of blade 20 moves to the right from the position illustrated in Fig. 3 to the position illustrated in Fig. 4. When the pin 25 finally passes dead center, the spring 26 is tensioned sufficiently and acts on pin 23 to impart a counterclockwise rotation to blade 17 as viewed in Fig. 5 to bring the arcuate slots 75 of blade 17 into uncovering relation with the aperture 16. At this time, the blade 20 has been moved to the position to cover the aperture. Thus, the upward movement of lug 74 serves to rock both blades 17 and 20 and in addition tension spring 26 tensions, sets or cocks the shutter (blades 17 and 20) so that the shutter is now in the cocked position illustrated in Fig. 2 and ready for the next exposure. This setting or cocking of the shutter occurs during the initial winding of the film, as is deemed apparent. After the shutter is set or cocked, continued rotation of knob 55 causes the lug 73 merely to move or oscillate freely up and down between the limits shown in Figs. 2 and 4 without imparting further movement either to blade 17 or 20.

Thus, the shutter is connected only momentarily or temporarily to the winding mechanism so that the shutter is cocked during only the initial winding of the film. Thereafter the winding mechanism is completely and automatically disconnected from the shutter. When the member 40 is actuated to make an exposure, the lug 73 of lever 66 is first moved out of the path of the blade 20 and the latter is released by moving lug 43 out of holding relation with the lug 44, and the tensioned spring 27 then operates to move both blades 17 and 20 relative to the exposure aperture 16 to make the exposure.

The mechanism of the present invention is novel, simple, rugged, easy to operate, and highly effective in use.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What we claim and desire to secure by Letters Patent of the United States is:

1. In a roll film camera, the combination with a camera body having a wall formed with an exposure aperture, an aperture cover blade and an aperture closing blade rockably mounted on said wall and movable to and from aperture covering position, means to connect said blades, a rotatable film winding knob, of means including a flexible lever to connect said knob to one of said blades to move and tension said blades when said knob is rotated to wind film, a shutter tripping member, means on said tripping member cooperating with one of said blades to retain the blades in said tensioned relation, means controlled by said tripping member to move said flexible lever out of connecting relation with said one blade and to release said retaining means to free said blades, and means to move said blades relative to said aperture to make an exposure.

2. In a roll film camera, the combination with a camera body having a wall formed with an exposure aperture, an aperture cover blade and an aperture closing blade rockably mounted on said wall and movable to and from aperture covering position, means to connect said blades, a rotatable film winding knob, of means including a flexible lever to connect said knob to one of said blades to move and tension said blades when said knob is rotated to wind film, said lever being automatically and completely disconnected from said one blade when said blades are tensioned but remaining in the path of said one blade, a shutter tripping member, means on said tripping member cooperating with one of said blades to retain said blades in said tensioned relation, means controlled by said tripping member to release said retaining means and to move said flexible lever out of said path to free said blades, and means to move said blades relative to said aperture and to each other to make an exposure.

3. In a roll film camera, the combination with a camera body having a wall formed with an exposure aperture, an aperture cover blade and an aperture closing blade rockably mounted on said wall and movable to and from aperture covering position, means to connect said blades, a rotatable film winding knob rotatably mounted on another wall of said body, means including a flexible lever movably mounted on said other wall and connected to said knob to be moved thereby, means for momentarily connecting said flexible lever to one of said blades so that said blades are tensioned during a portion only of the film winding operation of said knob, the latter and said lever being then disconnected from said one blade to free said knob for the completion of the film winding, said lever remaining in the path of said one blade upon disconnection therefrom, a shutter tripping member rockably mounted on said first wall, cooperating means on said tripping lever and one of said blades to retain said blades in tensioned relation, means controlled by the movement of said tripping member to make an exposure to move said flexible lever out of said path and substantially simultaneously to release said retaining means to free said blades, and means for moving said blades to uncover said aperture to make an exposure.

4. In a roll film camera, the combination with a camera body having a wall formed with an exposure aperture, an aperture cover blade and an aperture closing blade rockably mounted on said wall and movable to and from aperture covering position, means to connect said blades, a rotatable film winding knob rotatably mounted on another wall of said body, means including a flexible lever movably mounted on said other wall and connected to said knob to be moved thereby, means for momentarily connecting said flexible lever to one of said blades so that said blades are tensioned during a portion only of the film winding operation of said knob, the latter and said lever being then disconnected from said one blade to free said knob for the completion of the film winding, said lever remaining in the path of said one blade upon disconnection therefrom, a shutter tripping member rockably mounted on said first wall, means on said tripping member and said flexible lever positionable in the path of one of said blades to retain said blades in tensioned relation, means controlled by the movement of said tripping member to make an exposure to move both of said retaining means out of the path of said one blade to free said blades, and spring means to move the freed blades relative to said aperture to make an exposure.

5. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, a laterally flexible lever rockably mounted on said other wall, means to connect said lever to said knob so that rotation of said knob will oscillate said lever, said lever flexing laterally into the path of one of said blades so that said oscillation will move said lever into engagement with and move said one blade to tension both blades, said lever being automatically disconnected from said one blade upon the tensioning of said blades but remaining in the path of said one blade, a shutter tripping member rockably mounted on said first wall, cooperating means on said tripping member and said one blade to retain said blades in said tensioned relation, means controlled by the movement of said tripping member to make an exposure to release said retaining means and simultaneously to move said flexible lever laterally out of the path of said one blade to free said blades, and spring means to move said blades to uncover said aperture to make an exposure.

6. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, a laterally flexible lever rockably mounted on said other wall, a projecting lug on one of said blades, a cooperating lug on said flexible lever engaging said first lug to rock said blades to tension the latter when said lever is oscillated by the rotation of said knob, said lug on said lever being disengaged from the lug on said one blade when said blades have been tensioned, a shutter tripping member rockably mounted on said first wall, a second projecting lug on said one blade, a depending ear on said tripping member engaging said second lug to retain said blades in said tensioned relation, the movement of said tripping member to make an exposure serving to move said ear out of holding relation with said second lug, means operated by the movement of said tripping member to shift said lever laterally and out of the path of said first lug to free said blades, and spring means for moving said freed blades to uncover said aperture to make an exposure.

7. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, a laterally flexible lever rockably mounted on said other wall, a projecting lug on one of said blades, a cooperating lug on said flexible lever engaging said first lug to rock said blades to tension the latter when said lever is oscillated by the rotation of said knob, said lug on said lever being disengaged from the lug on said one blade when said blades have been tensioned, a shutter tripping member rockably mounted on said first wall, a second projecting lug on said one blade, a depending ear on said tripping member engaging said second lug to retain said blades in said tensioned relation, the movement of said tripping member to make an exposure serving to move said ear out of holding relation with said second lug, a follower slidably mounted on said first wall, means on said tripping member for sliding said follower laterally and into engagement with said flexible lever to shift the latter in one direction and out of the path of said first lug to free said blades when said tripping member is moved to make an exposure, and spring means connected to the tensioned blades to move the latter to uncover said apertures to make an exposure.

8. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, a laterally flexible lever rockably mounted on said other wall, a projecting lug on one of said blades, a cooperating lug on said flexible lever engaging said first lug to rock said blades to tension the latter when said lever is oscillated by the rotation of said knob, said lug on said lever being disengaged from the lug on said one blade when said blades have been tensioned, a shutter tripping member rockably mounted on said first wall, a second projecting lug on said one blade, a depending ear on said tripping member engaging said second lug to retain said blades in said tensioned relation the movement of said tripping member to make an exposure serving to move said ear out of holding relation with said second lug, a follower slidably mounted on said first wall, means on said tripping member for sliding said follower laterally and into engagement with said flexible lever to shift the latter in one direction and out of the path of said first lug to free said blades when said tripping member is moved to make an exposure, and spring means connected to the tensioned blades to move the latter to uncover said aperture to make an exposure, said flexible lever moving laterally in the opposite direction and serving to shift said follower to return said tripping member to its initial position and simultaneously to shift the lug on said lever into the path of the first lug on said one blade so that oscillation of said flexible lever will move the lug thereon into engagement with the first lug on said one blade to rock said blades to tension the latter.

9. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, a laterally flexible lever rockably mounted on said other wall, a projecting lug on one of said blades, a cooperating lug on said flexible lever engaging said first lug to rock said blades to tension the latter when said lever is oscillated by the rotation of said knob, said lug on said lever being disengaged from the lug on said one blade when said blades have been tensioned, a shutter tripping member rockably mounted on said first wall, a second projecting lug on said one blade, a depending ear on said tripping member engaging said second lug to retain said blades in said tensioned relation, the movement of said tripping member to make an exposure serving to move said ear out of holding relation with said second lug, a follower slidably mounted on said first wall, an element on said tripping member positioned in the path of and engaging and sliding said follower laterally and longitudinally when said tripping member is moved to make an exposure, said lateral movement of said follower shifting the latter into engagement with said lever to flex the latter laterally in one direction to move the lug on said lever out of the path of the first lug on said one blade to free said blades, and spring means to rock both of the tensioned blades in timed relation to uncover said aperture to make an exposure, said flexible lever then automatically moving in the opposite direction to shaft said follower to rock said tripping member to return the latter to its initial position and simultaneously move the lug on said flexible lever into the path of said first lug on said one blade so that the oscillation of said lever by said knob will cause the lug on said lever to move into engagement with the first lug on said one blade to rock said blades to tension the latter.

10. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, of a cam carried by and rotatable as a unit with said knob, an element rockably mounted on said other wall, and engaging and movable by said cam, a laterally flexible lever rockably mounted on said other wall, means to connect said lever to said element so that rotation of said knob will oscillate said lever, said lever being flexed in one direction and into the path of one blade to connect said lever momentarily to said one blade so that oscillation of said lever will rock said blades to tension the latter, said lever being automatically disconnected from said blades when the latter are tensioned, a blade releasing member rockably mounted on said first wall, cooperating means on said releasing member and said one blade for retaining said blades in said tensioned relation, the movement of said releasing member in one direction serving to disengage said cooperating means and also to flex said lever laterally to move the lever out of the path of said one blade to free said blades, and spring means to move said blades to uncover said aperture to make an exposure.

11. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, of a cam carried by and rotatable as a unit with said knob, an element rockably mounted on said other wall and engaging and movable by said cam, a laterally flexible lever rockably mounted on said other wall, means to connect said lever to said element so that rotation of said knob will oscillate said lever, said lever being flexed in one direction and into the path of one blade to momentarily connect said lever to said one blade so that oscillation of said lever will rock said blades to tension the latter, said lever being automatically disconnected from said blades when the latter are tensioned, a blade releasing member rockably mounted on said first wall, cooperating means on said releasing member and said one blade for retaining said blades in said tensioned relation, the movement of said releasing member in one direction serving to disengage said cooperating means and also to flex said lever laterally to move the lever out of the path of said one blade to free said blades, and spring means to move said blades to uncover said aperture to make an exposure, said flexible lever then flexing in the opposite direction to return said blade releasing member to its initial position and to position said flexible member in the path of said one blade so that oscillation of said lever will rock said blades to tension the latter.

12. In a roll film camera, the combination with a camera body having a wall formed with an exposure aperture, an aperture cover blade and an aperture closing blade rockably mounted on said wall and movable to and from aperture covering position, means to connect said blades, a film winding knob rotatably mounted on another wall of said body, of a cam carried by and rotatable as a unit with said knob, an element rockably mounted on said other wall, and engaging and movable by said cam, means to connect said lever to said element so that rotation of said knob will oscillate said lever, a lug on one of said blades, an operating portion on said lever, said lever flexing in one direction to move said portion into the path of said lug so that oscillation of said lever will move said portion into engagement with said lug to rock said blades to tension the latter, a blade releasing member rockably mounted on said first wall, means on said retaining member cooperating with one of said blades to hold said blades in said tensioned relation, said retaining member being movable to a releasing position to disengage said retaining member from said one blade, a lever moving part slidably mounted on said first wall, a lug on said retaining member movable into engagement with said part to move the latter into engagement with said lever to flex the latter to shift said portion out of the path of the lug on said one blade to free said blades, and spring means for moving both of said blades in timed relation to uncover said aperture to make an exposure, upon completion of the exposure, the lever flexing in said one direction to move said part into engagement with said releasing member to return the latter to its initial position and to move said portion into the path of the lug on said one blade so that oscillation of said lever will rock said blades to tension the blades.

13. In a roll film camera, the combination with a camera body having a wall formed with an exposure aperture, an aperture cover blade and an aperture closing blade rockably mounted on said wall and movable to and from aperture covering position, means to connect said blades, a rotatable film winding knob carried by another wall of said body, of a cam carried by and rotatable as a unit with said knob, a bellcrank lever pivotally mounted on said other wall and having an arm thereof in contact with said cam so that rotation of the latter by said knob will rock said bellcrank, a laterally flexible lever pivoted on said other wall, means to connect said flexible lever to the other arm of said bellcrank so that rocking of the latter will oscillate said flexible lever, a lug formed on the free end of said flexible lever, a lug formed on said cover blade positioned in the path of said first lug so that the oscillation of said flexible lever will bring the lug thereon into engagement with the lug on said cover blade to rock said blades to tension the blades, an arm pivoted on said first wall above said blades, cooperating lugs on said arm and said cover blade to hold said blades in said tensioned relation, the pivoting of said arm serving to disengage said cooperating lugs, a slidable follower mounted on said first wall and arranged adjacent said flexible lever, means on said arm movable into engagement with said follower when said arm is pivoted to move said follower in one direction toward and into engagement with said flexible lever to flex the latter laterally to move the lug on said flexible lever out of the path of said lug on said cover blade, the disengaging of said cooperating lugs and the movement of said lug on said flexible lever out of the path of the lug on said cover blade occurring substantially simultaneously to free the tensioned blades, and spring means to rock both of said blades in timed relation to uncover said aperture to make an exposure, upon release of said arm the flexible lever moves said follower in the opposite direction and moves the lug on said flexible lever into the path of the lug on said cover blade so that a subsequent rotation of said knob will rock said bellcrank and oscillate said flexible lever to rock said blades to tension the latter.

References Cited in the file of this patent

UNITED STATES PATENTS 2,664,799    Wilkinson _____ Jan. 5, 1954

FOREIGN PATENTS 1,062,074    France _____ Dec. 2, 1953
724,079    Great Britain _____ Feb. 16, 1955